United States Patent
Palm

(10) Patent No.: US 7,296,086 B2
(45) Date of Patent: Nov. 13, 2007

(54) MULTIPLE MODE OF OPERATION HANDSHAKING BETWEEN DSL MODEMS

(75) Inventor: Stephen Palm, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 892 days.

(21) Appl. No.: 10/688,805

(22) Filed: Oct. 17, 2003

(65) Prior Publication Data
US 2005/0021835 A1    Jan. 27, 2005

Related U.S. Application Data

(60) Provisional application No. 60/419,409, filed on Oct. 18, 2002.

(51) Int. Cl.
*G06F 13/00* (2006.01)
(52) U.S. Cl. .................. 709/237; 709/228; 709/250
(58) Field of Classification Search ................ 709/219, 709/227, 228, 230, 237, 250
See application file for complete search history.

(56) References Cited

U.S. PATENT DOCUMENTS

| | | | | |
|---|---|---|---|---|
| 5,170,470 A | * | 12/1992 | Pindar et al. ................. 710/8 |
| 5,696,599 A | * | 12/1997 | Tiso ........................... 358/434 |
| 6,188,669 B1 | * | 2/2001 | Bellenger .................... 370/230 |
| 6,396,912 B1 | * | 5/2002 | Mueller et al. ........... 379/93.32 |
| 6,690,721 B1 | * | 2/2004 | Murphy et al. .............. 375/222 |
| 6,788,705 B1 | * | 9/2004 | Rango ........................ 370/465 |

* cited by examiner

*Primary Examiner*—Viet D. Vu
(74) *Attorney, Agent, or Firm*—Garlick Harrison & Markison; Timothy W. Markison

(57) ABSTRACT

A method for handshaking between DSL modems begins when a central office DSL modem transmits an initiation signal that utilizes a pattern of symbol times to indicate timing and long range handshake mode. When the initiation signal was interpreted to be the C-SYNC signal, the remote DSL modem prepares a response signal that is an R-SYNC signal, an R-TONE signal, or an R-FLAG signal in response to the C-SYNC signal. The central office DSL modem interprets the response signal to determine whether it is the R-SYNC signal, the R-TONE signal, or the R-FLAG signal. When the response signal is the R-SYNC signal, the central office DSL modem provides a C-GALF signal to indicate symbol rate for the synchronous mode of the handshaking to the remote DSL modem. In response to the C-GALF signal, the remote DSL modem provides the R-FLAG signal in accordance with the symbol rate for the synchronous mode of the handshaking. In response to the R-FLAG signal, the central office DSL modem provides a C-FLAG signal in accordance with the symbol rate for the synchronous mode of the handshaking.

34 Claims, 10 Drawing Sheets

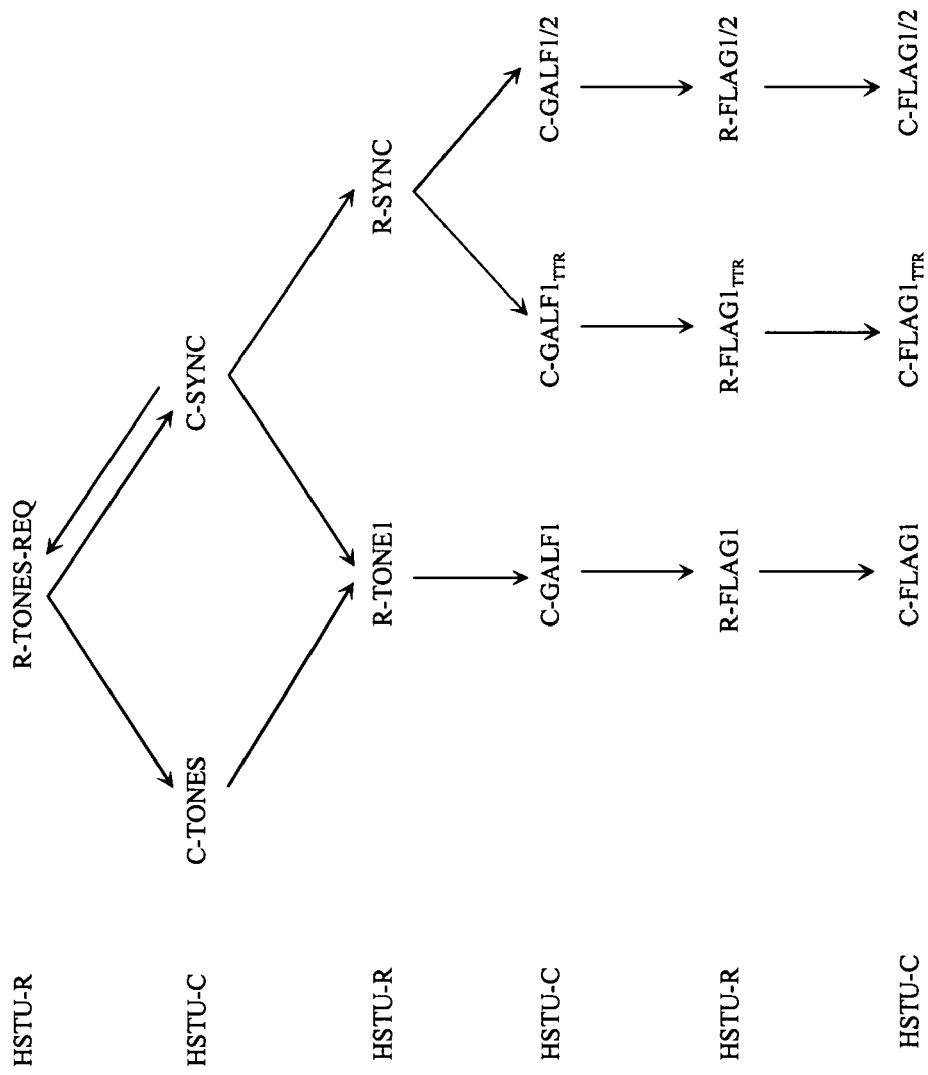

MULTIPLE MODE OF OPERATION HANDSHAKING BETWEEN DSL MODEMS

CROSS REFERENCE TO RELATED PATENTS

This invention is claiming priority under 35 USC § 119(e) to provisionally filed patent application having the same title, filed on Oct. 18, 2002, and having a provisional Ser. No. 60/419,409.

BACKGROUND OF THE INVENTION

1. Technical Field of the Invention

The present invention relates to communication systems, and more particularly to xDSL communication systems.

2. Description of Related Art

Most homes and businesses are connected to telephone networks using twisted pair copper wires. Until recently, these wires were used to carry data traffic in the analog voice band. However, with the advancement of technology, particularly Digital Subscriber Line (DSL) technology, the transfer of data over the higher frequencies in the twisted pair copper wires is becoming more prevalent. The greatest advantage of DSL is that it enables data to be exchanged over the twisted pair copper wires at much higher speeds than conventional modems and analog lines. Currently, there are many versions of DSL including, but not limited to Asymmetrical DSL (ADSL), Very high bit rate DSL (VHDSL), symmetrical DSL (SDSL and SHDSL), which are all collectively referenced as xDSL.

In general, xDSL communication systems support high-speed data links between a Central Office (CO) of a communication service provider and DSL modems serviced by the CO. Various xDSL solutions provide high-speed communication service worldwide. In an xDSL solution, an available spectrum is subdivided into a plurality of "tones," each of which carries either downstream information from the CO to a DSL modem or upstream information from the DSL modem to the CO. While the CO may service a plurality of xDSL modems, each serviced modem is coupled to the CO via a respective twisted pair of wires. The quality of the "channel" provided by a respective twisted pair or wires that couples an xDSL modem to its servicing CO will have a substantial determination in the throughput that may be achieved between the CO and the xDSL modem.

The quality of the channel between the CO and a serviced xDSL modem depends upon a number of factors. One of these factors is distance, i.e., from the CO to the xDSL modem. Another factor is media quality, e.g., type of media, number of connections, etc. Still another factor is interference that is coupled to the twisted pair. Interference may be produced by other xDSL modems, ingress interference, impulse noise, etc. One particular type of interference results when a binder containing a number of twisted pair wires is shared by xDSL modems and TCM-ISDN (Time Compression Multiplexing—Integrated Service Digital Network) disturbers. This type of interference is prevalent within those countries that service both types of modems, e.g., Japan. In some xDSL systems, TCM-ISDN interferers limit the ability for xDSL termination equipment to operate successfully with xDSL modems.

Various Recommendations, Standards, drafts and contributions address the operation of xDSL communications. These documents include:

[G.992.1] Recommendation G.992.1 (formerly known as G.dmt), entitled "Asymmetrical Digital Subscriber Line (ADSL) Transceivers", published in June 1999 by the International Telecommunication Union.

[G.992.2] Recommendation G.992.2 (formerly known as G.lite), entitled "Splitterless Asymmetrical Digital Subscriber Line (ADSL) Transceivers", published in June 1999 by the International Telecommunication Union.

[G.994.1] Recommendation G.994.1, entitled "Handshake Procedures For Digital Subscriber Line (DSL) Transceivers", published in June 1999 by the International Telecommunication Union.

[G.996.1] Recommendation G.996.1, entitled "G.996.1: Test Procedures for Digital Subscriber Line (DSL) Transceivers", published in June 1999 by the International Telecommunication Union.

The G.994.1 is used to handshake between two ADSL modems in order to select mutual line transmission method and operating parameters. When G.994.1 was originally developed in 1999, one of the significant design discussions centered on the selection of the carriers (tones) to be used for each ADSL annex. Annex C (ADSL in the presence of TCM-ISDN) was unable to use the same tones as Annex A or Annex B because of the disturbance from TCM-ISDN in the binder.

FIG. 1 displays the timing for the HSTU-R (i.e., the remote DSL modem) initiated duplex start-up procedure. Initially, the HSTU-R is in state R-SILENT0 transmitting silence, and the HSTU-C (i.e., the central office DSL modem) is in state C-SILENT1 transmitting silence. The HSTU-R shall initiate the start-up procedure by transmitting signals from one or both of its signaling families, with phase reversals every 16 ms (R-TONES-REQ). When this has been detected by the HSTU-C, the HSTU-C shall respond by transmitting signals from one or both of its signaling families (C-TONES). When this has been detected by the HSTU-R, the HSTU-R shall transmit silence (R-SILENT1) for 50 to 500 ms and shall then transmit signals from only one signaling family (R-TONE1). The minimum detection time for C-TONES shall be 50 ms. When the HSTU-C has detected R-TONE1, it shall respond by transmitting Galfs on modulated carriers (C-GALF1). When the HSTU-R has detected Galfs, it shall respond by transmitting Flags on modulated carriers (R-FLAG1). When the HSTU-C has detected Flags, it shall respond by transmitting Flags (C-FLAG1). When the HSTU-R has detected Flags, it shall begin the first transaction. FIG. 1 further shows the timing requirements between events that shall be adhered to $\tau_1$ is the time period from detection of a signal (e.g. R-TONE1) to the transmission of the next signal (e.g. C-GALF1).

FIG. 2 illustrates the timing for the HSTU-C initiated duplex start-up procedure. Initially, the HSTU-R is in state R-SILENT0 transmitting silence, and the HSTU-C is in state C-SILENT1 transmitting silence. The HSTU-C shall initiate the start-up procedure by transmitting signals from one or both of its signaling families (C-TONES). When this has been detected by the HSTU-R, the HSTU-R shall respond by transmitting signals from only one signaling family (R-TONE1). The minimum detection time for C-TONES shall be 50 ms. When the HSTU-C has detected R-TONE1, it shall respond by transmitting Galfs on modulated carriers (C-GALF1). When the HSTU-R has detected Galfs, it shall respond by transmitting Flags on modulated carriers (R-FLAG1). When the HSTU-C has detected Flags, it shall respond by transmitting Flags (C-FLAG1). When the HSTU-R has detected Flags, it shall begin the first transaction. FIG. 2 further shows the timing requirements between events that shall be adhered to. $\tau_1$ is the time period from detection of a signal (e.g. R-TONE1) to the transmission of the next signal (e.g. C-GALF1).

When G.994.1 was developed, those familiar with the art knew that G.994.1 successfully operated to approximately 4 km in the presence of TCM-ISDN in the binder. Advances in ADSL modem technology have suggested that ADSL could operate at distances significantly greater than 4 km. Thus, a handshaking means that operates at distances greater than 4 km is needed.

BRIEF SUMMARY OF THE INVENTION

These needs and others are substantially met by the multiple mode handshaking between two DSL modems. In one embodiment, a method for handshaking between two digital subscriber loop (DSL) modems that begins when a central office DSL modem transmits an initiation signal that utilizes a pattern of symbol times to indicate timing and long range handshake mode. The processing then continues when a remote DSL modem interprets the initiation signal to be a C-SYNC signal or a C-TONE signal, wherein the C-SYNC signal indicates a synchronous mode of handshaking. The processing continues when the initiation signal was interpreted to be the C-SYNC signal, the remote DSL modem prepares a response signal that is an R-SYNC signal, an R-TONE signal, or an R-FLAG signal in response to the C-SYNC signal, wherein the R-SYNC signal includes an acceptance of the synchronous mode of the handshaking. The processing then continues when the remote DSL modem provides the response signal to the central office DSL modem. The method then continues when the central office DSL modem interprets the response signal to determine whether the response signal is the R-SYNC signal, the R-TONE signal, or the R-FLAG signal. The processing then continues, when the response signal is the R-SYNC signal, the central office DSL modem provides a C-GALF signal to indicate symbol rate for the synchronous mode of the handshaking to the remote DSL modem. The processing continues when, in response to the C-GALF signal, the remote DSL modem provides the R-FLAG signal in accordance with the symbol rate for the synchronous mode of the handshaking. The processing then continues when, in response to the R-FLAG signal, the central office DSL modem provides a C-FLAG signal in accordance with the symbol rate for the synchronous mode of the handshaking.

BRIEF DESCRIPTION OF THE SEVERAL VIEWS OF THE DRAWINGS

FIG. 7 is a diagram illustrating handshaking between two DSL modems in accordance with the present invention;

FIG. 8 is a diagram illustrating symbols used for downstream transmissions in accordance with the present invention; and FIG. 9 is a diagram illustrating symbols used for upstream transmissions in accordance with the present invention.

DETAILED DESCRIPTION OF THE INVENTION

Figure 1:
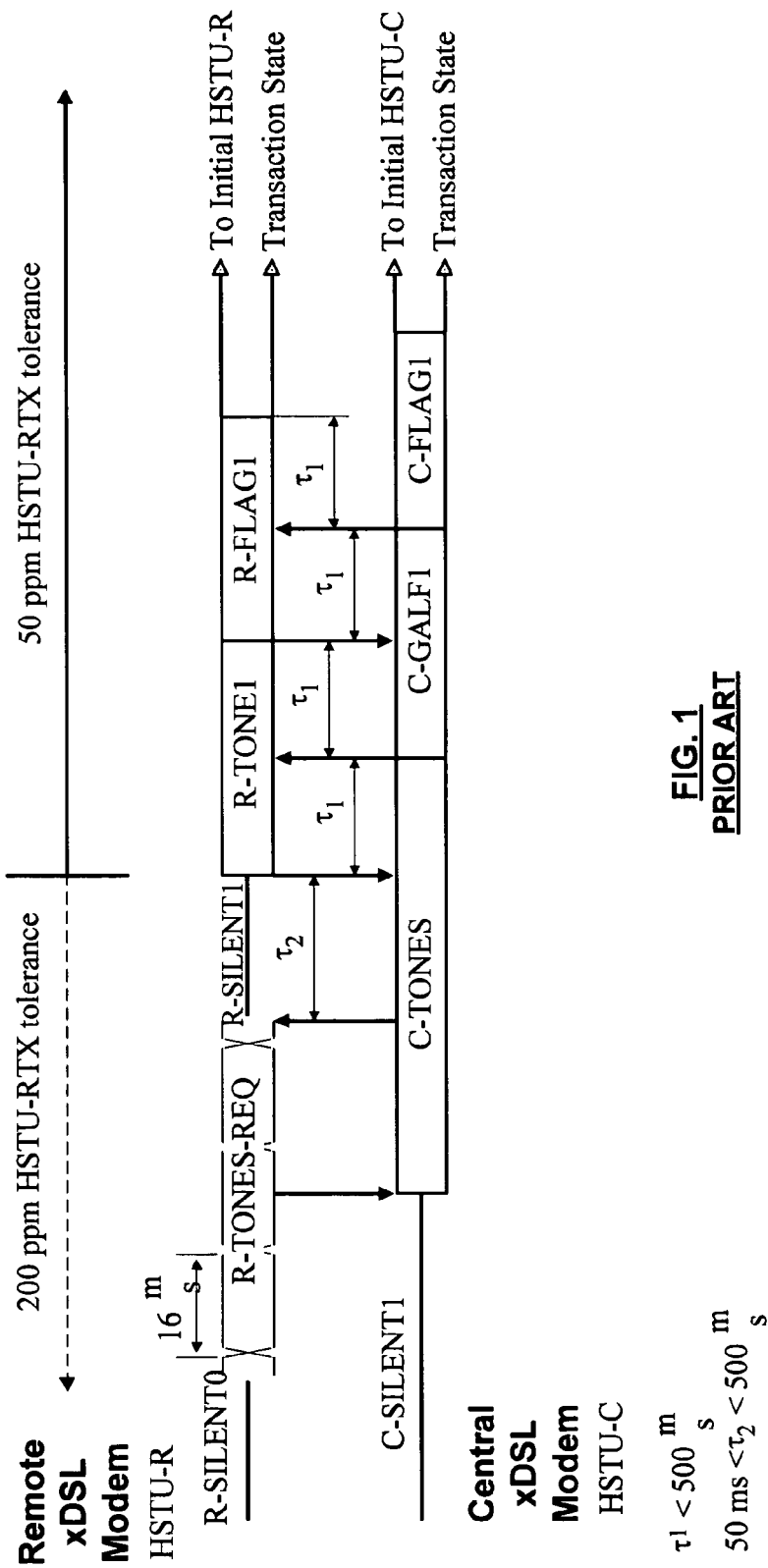
FIG. 1 is a signaling diagram of a prior art DSL handshaking procedure.
Figure 2:
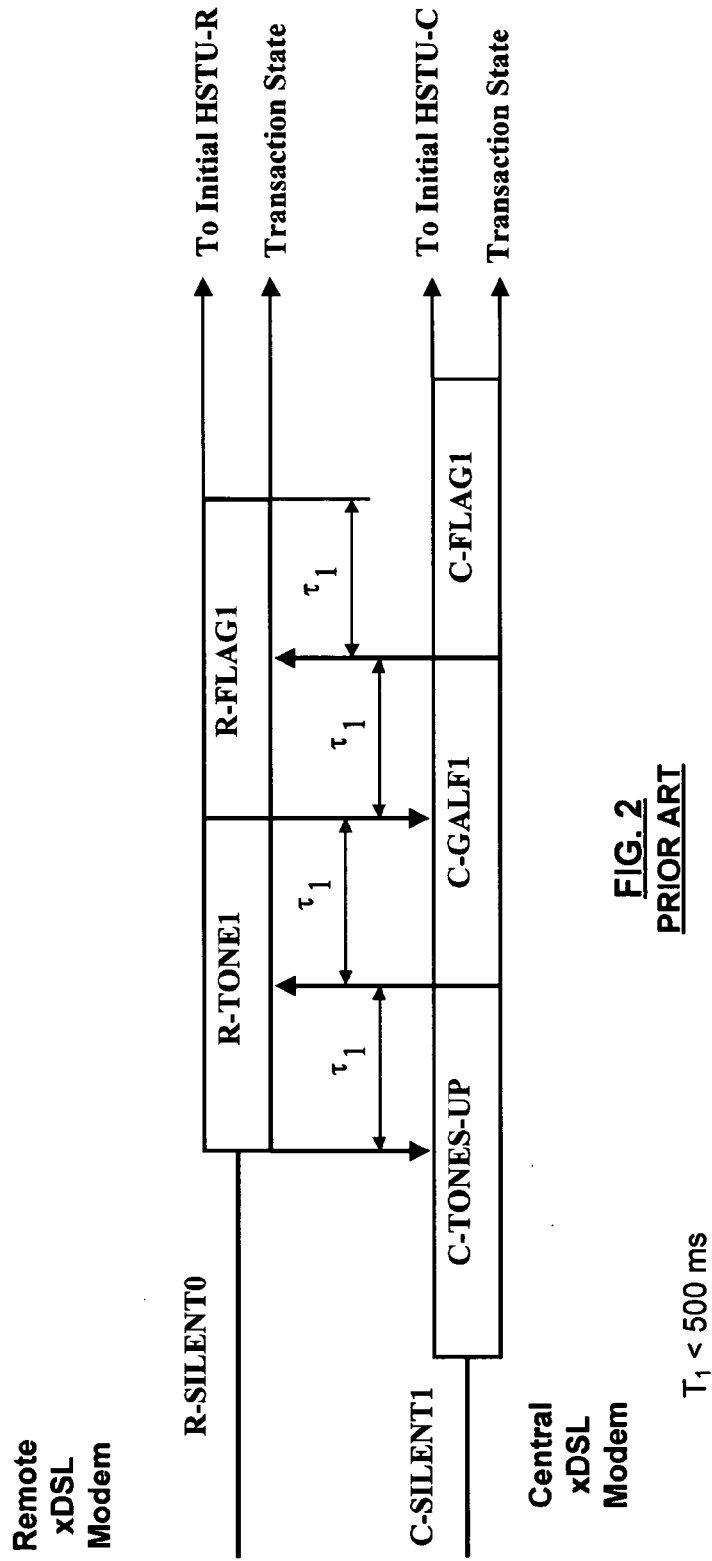
FIG. 2 is another signaling diagram of a prior art DSL handshaking procedure.
Figure 3:
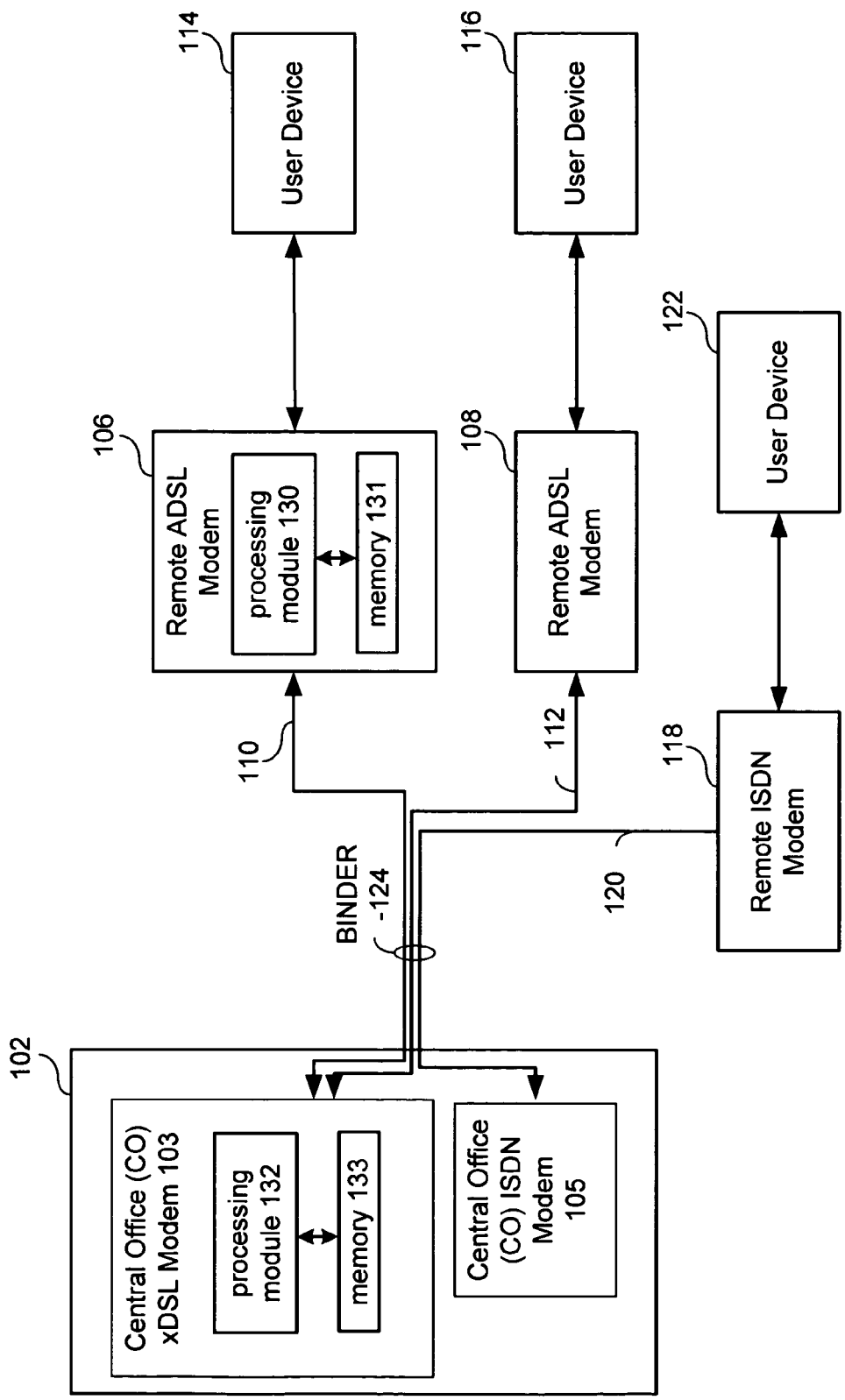
FIG. 3 is a schematic block diagram of a DSL communication system in accordance with the present invention.

FIG. 3 is a high level block diagram of a communications system in accordance with embodiments of the present invention. The communication system includes a Central Office (CO) 102 that is owned/serviced by a phone company or other communications system service providers. The CO 102 includes CO xDSL modem termination equipment 103 and CO ISDN modem termination equipment 105. The CO xDSL modem termination equipment 103 includes a processing 132 and memory 133. The processing module 132 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 133 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 132 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 133 stores, and the processing module 132 executes, operational instructions corresponding to at least some of the steps and/or functions illustrated in FIGS. 4-9.

The CO xDSL modem termination equipment 103 services remote ADSL modems 106 and 108 that service user devices 114 and 116, respectively. The CO ISDN modem termination equipment 105 services remote ISDN modem 118 that services user device 122. A binder 124 contains twisted pair (or other) wiring 110 and 112 that service remote ADSL modems 106 and 108, respectively, and also contains twister pair (or other) wiring 120 that services remote ISDN modem 118. Each remote DSL modem 106 and 108 includes a processing 130 and memory 131. The processing module 130 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 131 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 130 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 131 stores, and the processing module 130 executes, operational instructions corresponding to at least some of the steps and/or functions illustrated in FIGS. 4-9. As one of average skill in the art will appreciate, the xDSL modems may also be referred to as DSL transceivers.

Because twisted pair wiring 120 and twisted pair wiring 110 and 112 resides within binder 124, strong signal coupling may occur. In particular, the ISDN modem communications, serviced according to TCM-ISDN operations, for example may disturb handshaking signals of the xDSL components. Thus, according to the present invention, xDSL handshaking operations are modified to improve handshaking performance as will be described with reference to FIGS. 4-9. Resultantly, longer distances (and poorer channels) between the CO 102 and the remote ADSL modems 106 and 108 are supported than were supported according to the prior art.

Figure 4:
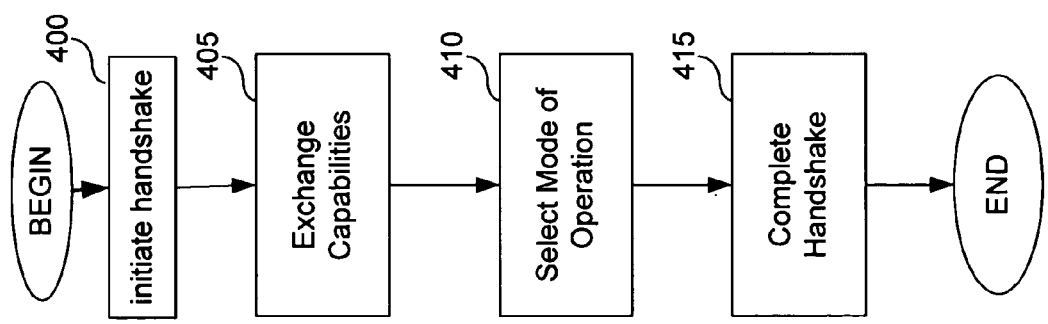
FIG. 4 is logic diagram of a method for a DSL handshake between two DSL modems in accordance with the present invention.

FIG. 4 is a flowchart of a method for handshaking xDSL modems in accordance with embodiments of the present invention. The processing begins at step 400 where the remote or the central office DSL modem initiates the handshaking process. The initiation of the handshaking process will be described in greater detail with reference to FIGS. 5-9. With a successful initiation of the handshaking, the processing continues at step 405 where the xDSL modems (at CO and at customer premises) exchange capabilities (e.g., which types of DSL they support (e.g., ADSL, VHDSL, etc.) and which versions of the particular DSL types they support). Once the capabilities have been exchanged, the process proceeds to step 410 where the xDSL modems select a mode of operation (e.g., select a version of a type of DSL that both support). The process then proceeds to step 415 where the handshake is completed (e.g., acknowledgements of the mode of operation, set up for data communication, etc.).

Figure 5:
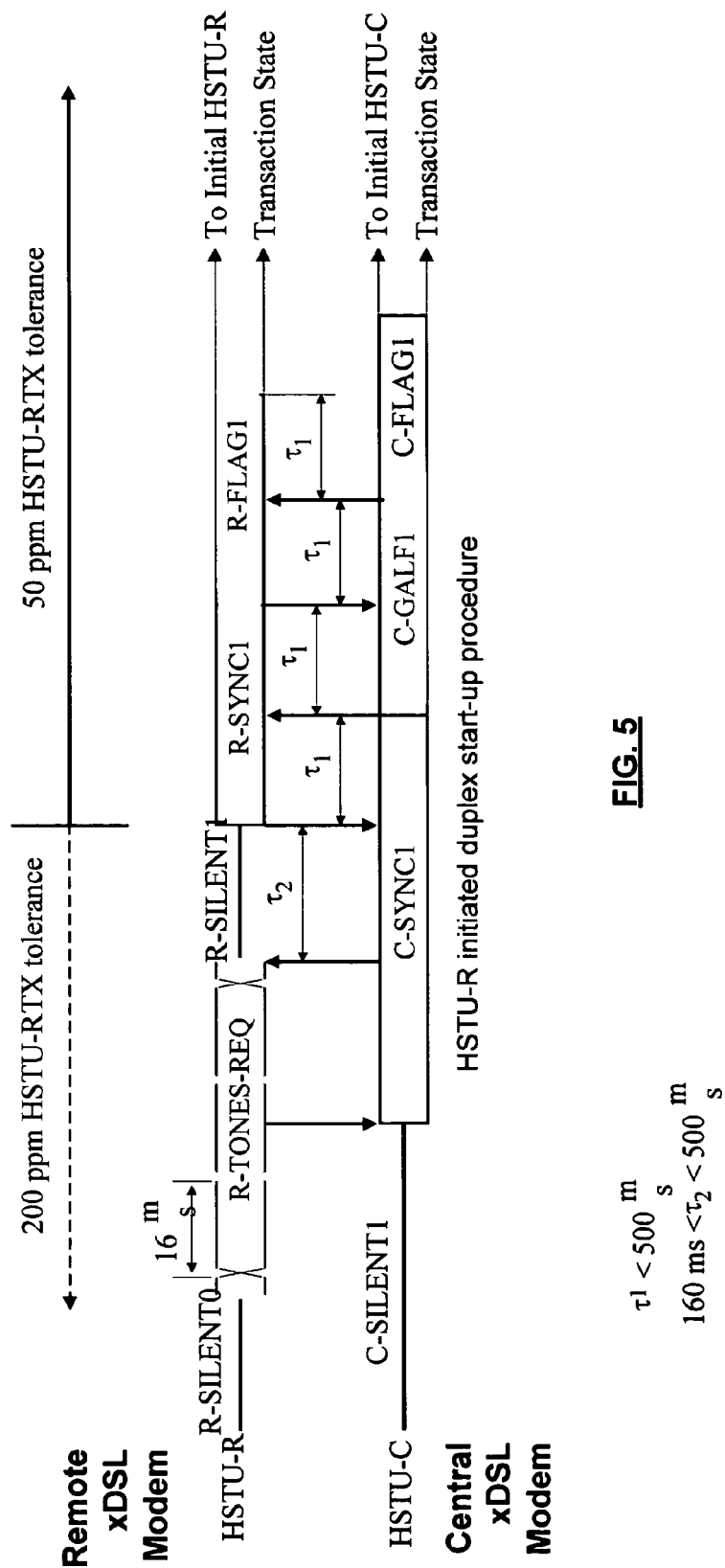
FIG. 5 is a signaling diagram of initiating a DSL handshake between two DSL modems in accordance with the present invention.

FIG. 5 is a signaling diagram of initiating a DSL handshake by a remote DSL modem with the central office DSL modem, wherein the handshaking, and subsequent DSL communication, may be done one of a plurality of operational modes. For instance, the operational modes include, but are not limited to, duplex half symbol rate (DHSR) modulation, TTR synchronized (TTRS) modulation, full duplex mode, and/or half duplex mode. Examples of combinations of the operational modes include full duplex TTRS modulation and half duplex TTRS modulation. In this illustration, the handshaking is initiated with the assumption that the distance between the two DSL modems is long (e.g., greater than 4 Km) and that interference from ISDN transmissions will be present. Based on these assumptions, the handshaking is initiated by the remote DSL by transmitting an R-TONE-REQ signal following a silence interval (R-SILENT0). As one of average skill in the art will appreciate, the various embodiments of the handshaking in accordance with the present invention may be used for short range handshaking and without interference from ISDN transmissions.

Figure 8:
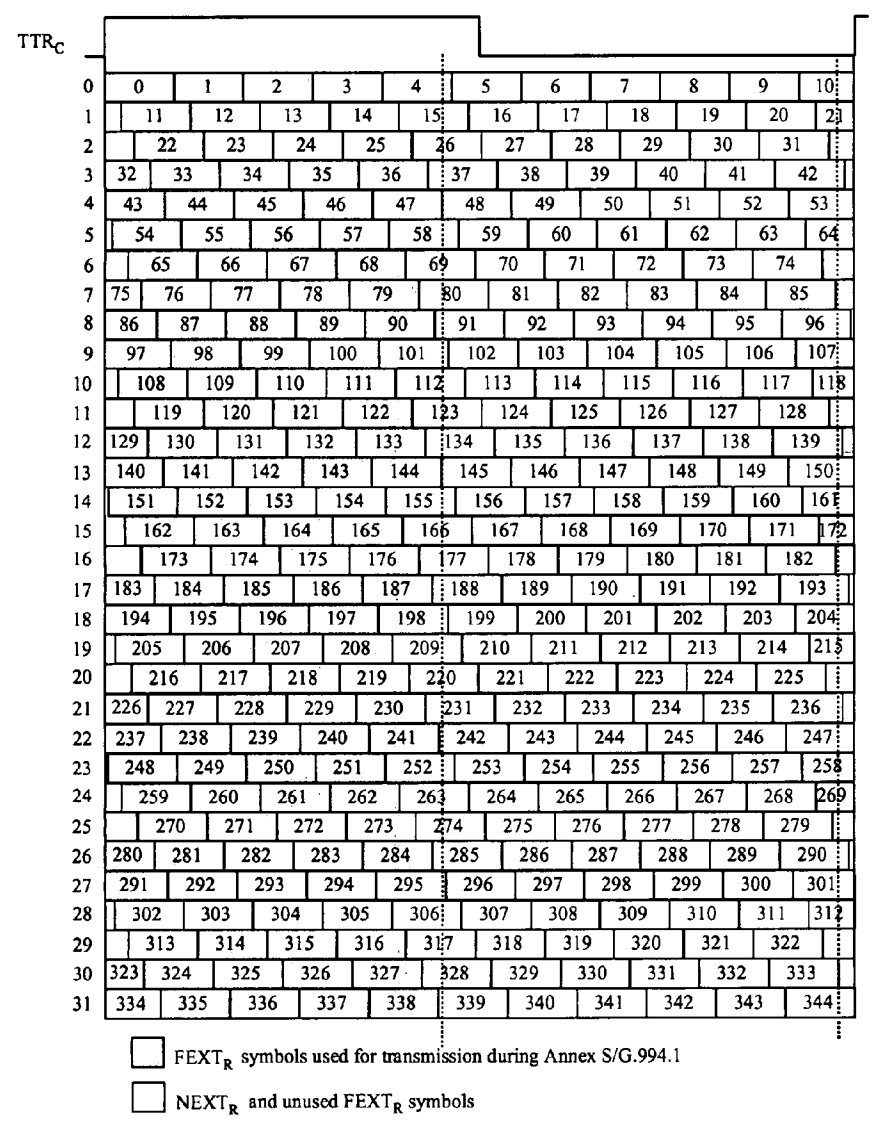

In response to the R-TONE-REQ signal, the central office DSL modem begins transmitting C-SYNC signal that is aligned with TTR hyperframe. In one embodiment, the C-SYNC signal is transmitting unmodulated carriers that are synchronized with $TTR_C$ as shown in FIG. 8. The signal is transmitted during the shaded time slots (DMT symbols) and silence is transmitted in the unshaded time slots (DMT symbols).

Figure 9:
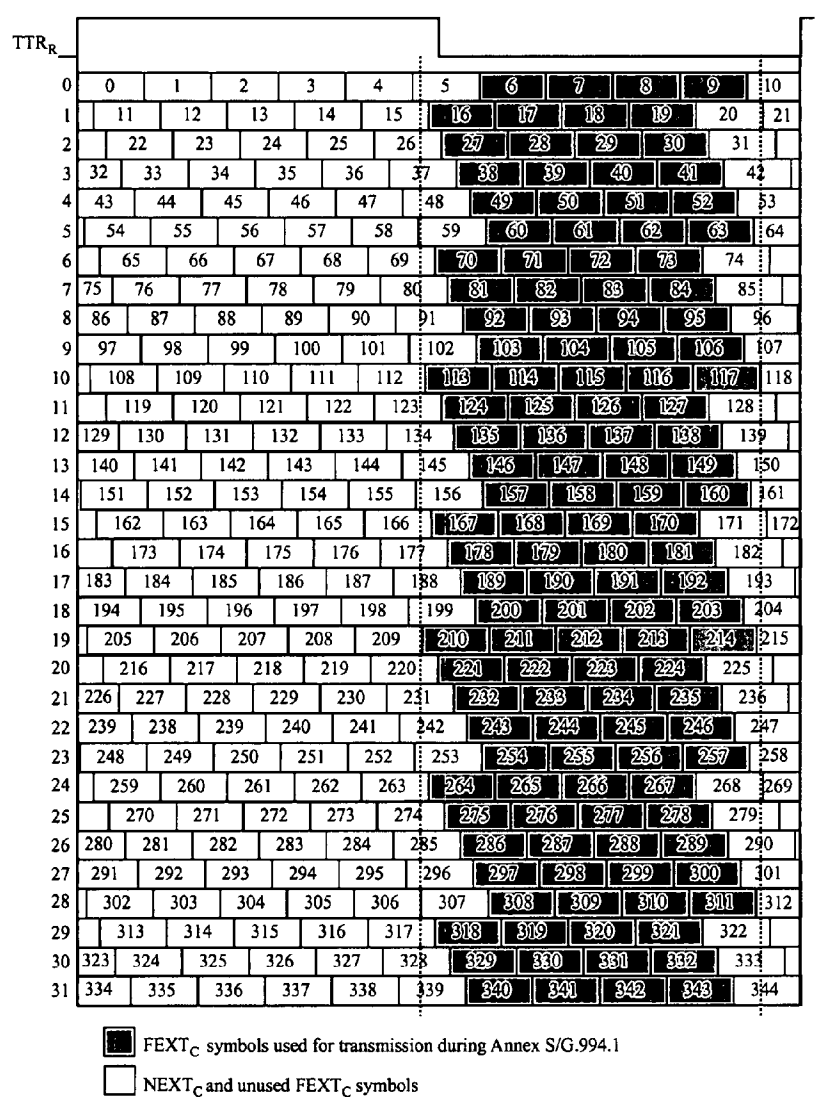

In response to the C-SYNC signal, the remote DSL modem, if it is capable of and desires to operate in this mode, transmits an R-SYNC signal aligned with a TTR hyperframe. Note that the remote DSL modem may continue transmitting the R-TONE-REQ signal until it has acquired TTR synchronization from the C-SYNC signal. In one embodiment, the R-SYNC signal is transmitting unmodulated carriers that are synchronized with $TTR_R$ as shown in FIG. 9. The signal is transmitted during all shaded time slots (DMT symbols) and silence is transmitted in the unshaded time slots (DMT symbols).

Once the central office DSL modem detects the R-SYNC signal, it determines the mode of operation it wishes to use (e.g., Duplex half symbol rate (DHSR) or TTR Synchronized (TTRS) mode). Note that for DHSR, the symbol rate used is 4312.5/16=269.53125 symbols per second as opposed to 4312.5/8=539.0625 symbols per second as currently defined in section 6.1.1/G.994.1. Further note that for TTR Synchronized (TTRS) modulation, the carrier frequencies within the carrier set are simultaneously modulated with the same data bits using differentially encoded binary Phase Shift Keying (DPSK). The transmit point is rotated 180° from the previous point if the transmit bit is a 1, and the transmit point is rotated 0° from the previous point if the transmit bit is a 0. The modulation shall be synchronized with $TTR_C$ and $TTR_R$ respectively as shown in FIG. 8 for downstream and FIG. 9 for upstream. Energy shall only be transmitted during all shaded time slots (DMT symbols). Silence shall be transmitted in all unshaded time slots (DMT symbols). The symbol rate shall be 4312.5*32/345 =400 symbols per second.

If the central office DSL modem selects DHSR as the mode of operation, it transmits a C-GALF signal using the half symbol rate modulation. If the central office DSL mode selects the TTR Synchronized (TTRS) mode, it transmits the C-GALF1 signal using the TTR synchronized modulation. The central office DSL modem shall maintain the selected mode of operation, i.e., the modulation, throughout the subsequent handshake procedure.

In response to the C-GALF signal, the remote DSL mode transmits an R-FLAG1 signal using the same modulation as the central office DSL modem used for C-GALF1. At this point, the handshaking proceeds as per G.994.1 using the modulation selected during C-GALF1, where R-FLAG and C-FLAG signals are exchanged.

If a legacy HSTU-R, i.e., remote DSL modem, does not respond to the C-SYNC1 signal by transmitting R-SYNC1, the HSTU-C, i.e., the central office DSL modem, shall stop transmitting C-SYNC1, shall transmit C-TONES, and shall proceed according to the legacy G.994.1 procedure.

Figure 6A:
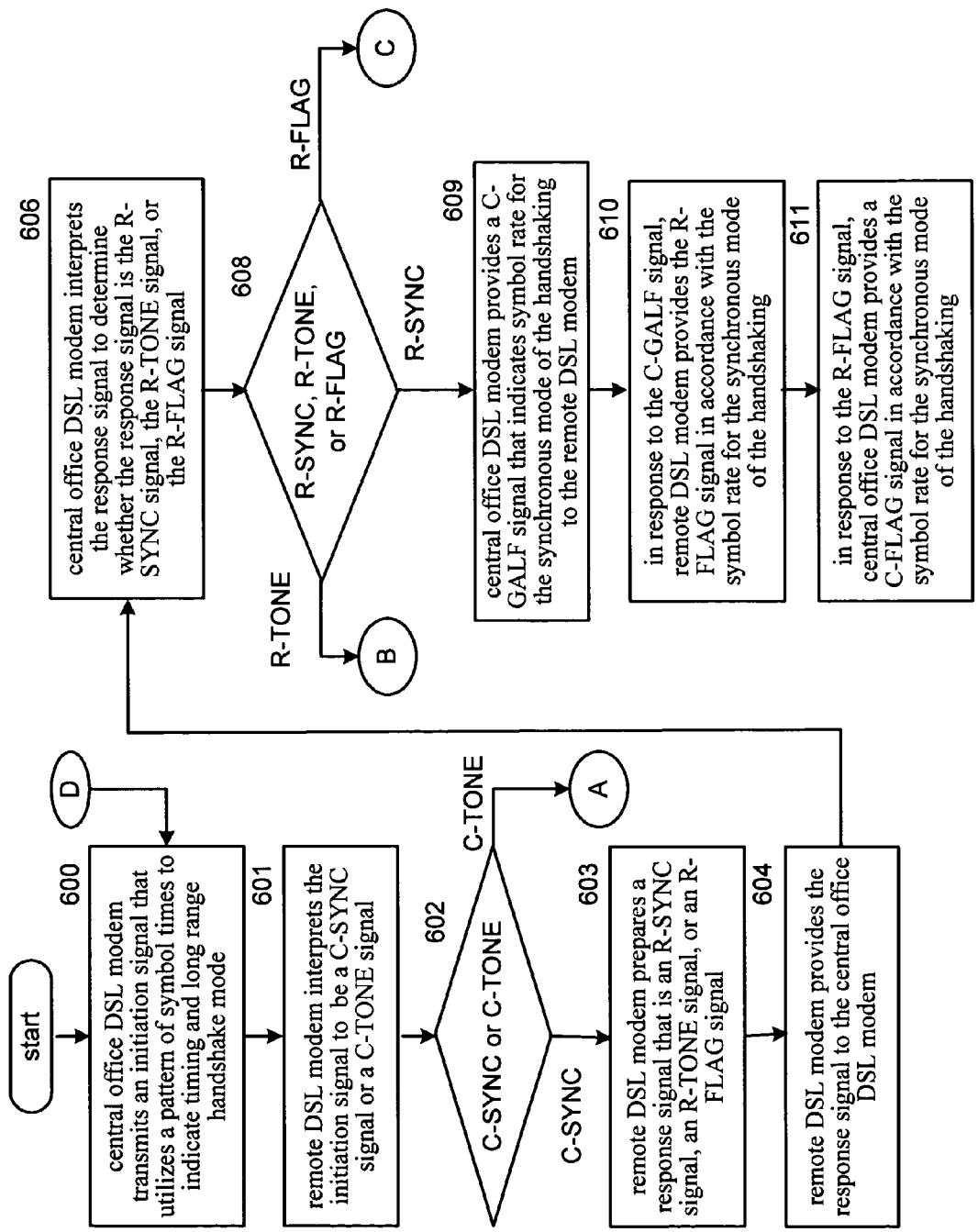
FIGS. 6A and 6B are a logic diagram of method of handshaking between two DSL modems in accordance with the present invention.
Figure 6B:
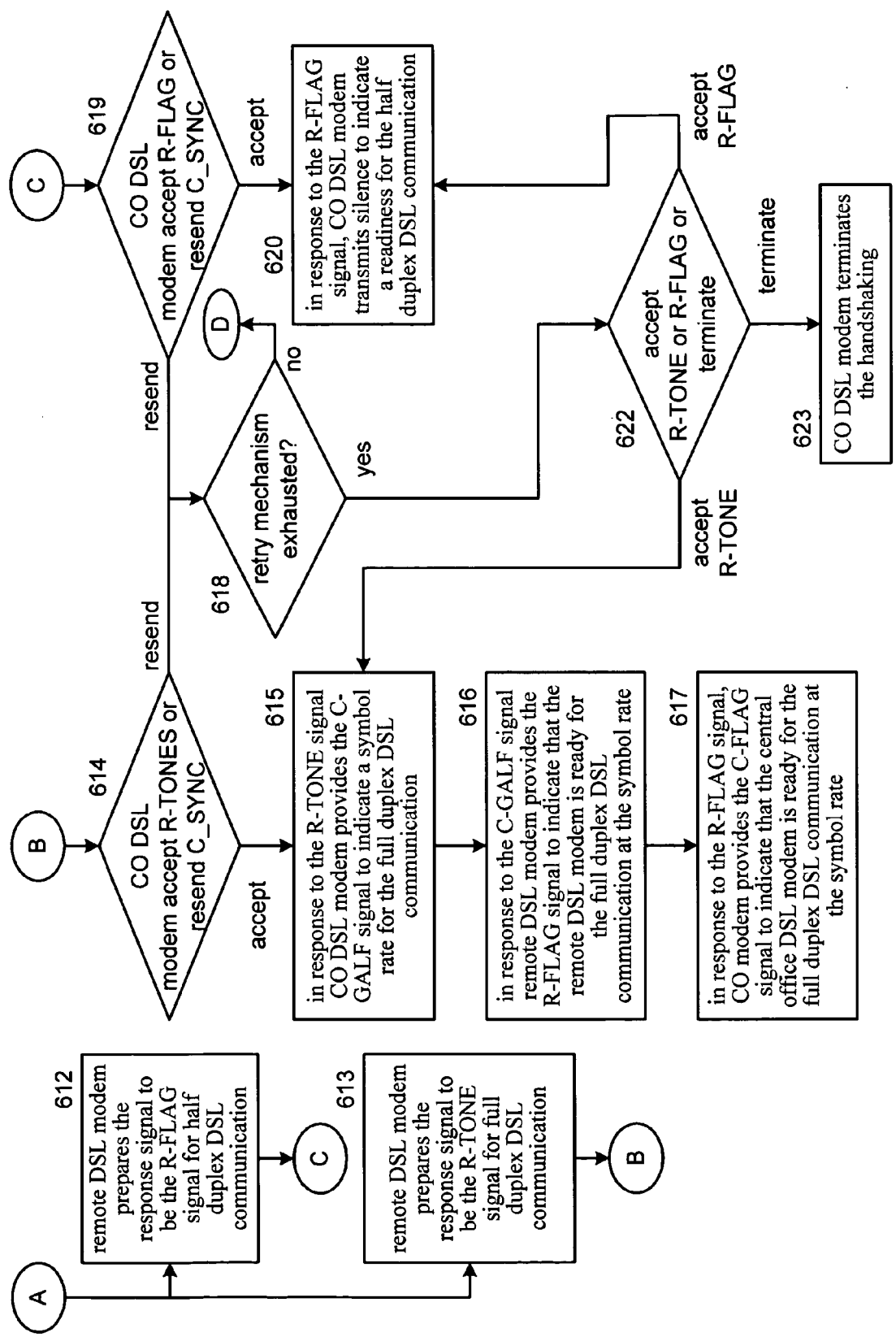

FIGS. 6A and 6B are a logic diagram of method of initiating a handshaking between two DSL modems. The processing begins at step 600 where the central office DSL modem transmits an initiation signal (e.g., a C-SYNC signal or the legacy C-TONE signal) that utilizes a pattern of symbol times to indicate timing and long range handshake mode as discussed with reference to FIG. 5. Note that the central office DSL modem may transmit the initiation signal in response to an R-TONE-REQ signal received from the remote DSL modem, where the R-TONE-REQ signal requests initiation of a DSL communication.

The process then proceeds to step 601, where the remote DSL modem interprets the initiation signal to be a C-SYNC signal or a C-TONE signal, wherein the C-SYNC signal indicates a synchronous mode of handshaking as discussed with reference to FIG. 5. Note that if the remote DSL modem is a legacy modem, it will interpret C-SYNC signals as C-TONE signals. The process then branches at step 602 depending on whether the remote DSL modem interpreted the initiation signal as a C-SYNC signal or a C-TONE signal.

When the initiation signal was interpreted to be the C-SYNC signal, the process proceeds to step 603 where the remote DSL modem prepares a response signal that is an R-SYNC signal, an R-TONE signal, or an R-FLAG signal in response to the C-SYNC signal. As such, the remote DSL modem may accept the central office DSL modem's selection to perform the handshaking using the long range protocol of the present invention by preparing the R-SYNC signal or reject it by preparing the legacy R-TONE or R-FLAG signal. If the remote DSL mode prepares the R-TONE or R-FLAG signal, it is indicating to the central office DSL modem that it desires to use the legacy handshaking procedure. Further note that, if the remote DSL mode prepares the R-TONE signal, it is indicating its preference for full duplex DSL communication and, if the remote DSL modem prepares the R-FLAG signal, it is indicating its desire for half duplex DSL communication.

The process then proceeds to step 604, where the remote DSL modem provides the response signal to the central office DSL modem. The process then proceeds to step 606 where the central office DSL modem interprets the response signal to determine whether the response signal is the R-SYNC signal, the R-TONE signal, or the R-FLAG signal. The process then branches at step 608 depending on the interpretation of the response signal.

When the response signal is the R-SYNC signal, the process proceeds to step 609 where the central office DSL modem prepares a C-GALF signal to indicate symbol rate for the synchronous mode of the handshaking to the remote DSL modem, which was described with reference to FIG. 5. The process then proceeds to step 610, where, in response to the C-GALF signal, the remote DSL modem provides the R-FLAG signal in accordance with the symbol rate for the synchronous mode of the handshaking. The process then proceeds to step 611, where, in response to the R-FLAG signal, the central office DSL modem provides a C-FLAG signal in accordance with the symbol rate for the synchronous mode of the handshaking.

If, at step 602, the remote DSL modem interprets the initiation signal to be a C-TONE signal, the process then proceeds to steps 612 or 613 on FIG. 6B. At step 612 the remote DSL modem prepares the response signal to be the R-FLAG signal for half duplex DSL communication. The process then proceeds to step 619, which will be discussed below. At step 613 the remote DSL modem prepares the response signal to be the R-TONE signal for full duplex DSL communication. The process then proceeds to step 614.

At step 614, the central office DSL modem may accept the R-TONE signal and proceed with a legacy handshake or reject it and resend the C-SYNC signal for multiple mode long range handshaking in accordance with the present invention. If the central office accepts the R-TONE signal, the process proceeds to step 615, where, in response to the R-TONE signal, the central office DSL modem provides the C-GALF signal to indicate a symbol rate for the full duplex DSL communication. The process then proceeds to step 616 where, in response to the C-GALF signal, the remote DSL modem provides the R-FLAG signal to indicate that the remote DSL modem is ready for the full duplex DSL communication at the symbol rate. The process then proceeds to step 617, where, in response to the R-FLAG signal, the central office modem provides the C-FLAG signal to indicate that the central office DSL modem is ready for the full duplex DSL communication at the symbol rate.

At step 619, the central office DSL modem determines whether it will accept the R-FLAG signal or reject it by resending the C-SYNC signal. If the central office DSL modem rejects the R-FLAG signal, the process proceeds to step 618, which will be discussed below. If, however, the central office DSL modem accepts the R-FLAG signal, the process proceeds to step 620 where, in response to the R-FLAG signal, transmitting, by the central office DSL modem, silence to indicate a readiness for the half duplex DSL communication.

At step 618, the central office DSL modem determines whether it has exhausted a retry mechanism for resending the C-SYNC signal. If not, the process repeats at step 600 on FIG. 6A. If, however, the retry mechanism has been exhausted, the process proceeds to step 622, where the central office DSL modem determines whether it will accept the R-TONE or R-FLAG signal or reject them. If the central office DSL modem rejects the signals, the process proceeds to the step 623 where the DSL handshaking is terminated. If the central office DSL modem accepts the R-FLAG signal, the process proceeds to step 620. If the central office DSL modem accepts the R-TONE signal, the process proceeds to step 615.

FIG. 7 is a diagram illustrating handshaking between two DSL modems in accordance with the present invention. As shown, the handshaking process begins when the remote DSL modem (HSTU-R) transmits an R-TONE-REQ signal to the central office DSL modem (HSTU-C). The central office DSL modem may elect to response to the handshaking request using a legacy process as defined in G.994.1 or in accordance with one or more of the various embodiments of the long range handshaking procedure of the present invention.

If the central office DSL modem elects to use the legacy procedure, it sends a C-TONE signal to the remote DSL modem. In response, the remote DSL modem provides an R-TONE signal, which is followed by a C-GALF signal, R-FLAG signal, and a C-FLAG signal.

If the central office DSL modem elects to use of the embodiments of the long range handshaking procedure of the present invention, it sends a C-SYNC signal to the remote DSL modem. If the DSL modem responds to the C-SYNC signal with an R-TONE signal, the central office DSL modem has the choice of using the legacy process or resending the C-SYNC signal. If the central office DSL modem resends the C-SYNC signal and the remote DSL modem continues to respond with the R-TONE signal, the central office DSL modem may then decide to accept the legacy handshaking protocol or terminate the handshaking.

If the remote DSL modem responds to the C-SYNC signal with an R-SYNC signal, the central office DSL modem determines the desired symbol rate (e.g., duplex half symbol rate mode or TTR synchronized mode). If the central office elects the half symbol rate it sends a C-GALF½ signal to the remote DSL modem, wherein the C-GALF½ signal is modulated in accordance with the duplex half symbol rate. In response to the C-GALF½ signal, the remote DSL modem sends an R-FLAG½ signal, which is modulated in accordance with the duplex half symbol rate. In response to the R-FLAG½ signal, the central office DSL modem sends a C-FLAG½ signal, which is modulated in accordance with the duplex half symbol rate.

If the central office elects the TTR synchronized mode it sends a C-GALF$_{TTR}$ signal to the remote DSL modem, wherein the C-GALF$_{TTR}$ signal is modulated in accordance with the TTR synchronized mode. In response to the C-GALF$_{TTR}$ signal, the remote DSL modem sends an R-FLAG$_{TTR}$ signal, which is modulated in accordance with the TTR synchronized mode. In response to the R-FLAG$_{TTR}$ signal, the central office DSL modem sends a C-FLAG$_{TTR}$ signal, which is modulated in accordance with the TTR synchronized mode.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for long range DSL handshaking using multiple modes of operation. As one of average skill in the art will appreciate, other embodiments may be derived from the teachings of the present invention without deviating from the scope of the claims.

What is claimed is:

1. A method handshaking between two digital subscriber loop (DSL) modems, the method comprises:
   transmitting, by a central office DSL modem, an initiation signal that utilizes a pattern of symbol times to indicate timing and long range handshake mode;
   interpreting, by a remote DSL modem, the initiation signal to be a C-SYNC signal or a C-TONE signal, wherein the C-SYNC signal indicates a synchronous mode of handshaking;
   when the initiation signal was interpreted to be the C-SYNC signal, preparing, by the remote DSL modem, a response signal that is an R-SYNC signal, an R-TONE signal, or an R-FLAG signal in response to the C-SYNC signal, wherein the R-SYNC signal includes an acceptance of the synchronous mode of the handshaking;
   providing, by the remote DSL modem, the response signal to the central office DSL modem;
   interpreting, by the central office DSL modem, the response signal to determine whether the response signal is the R-SYNC signal, the R-TONE signal, or the R-FLAG signal;
   when the response signal is the R-SYNC signal, providing, by the central office DSL modem, a C-GALF signal to indicate symbol rate for the synchronous mode of the handshaking to the remote DSL modem;
   in response to the C-GALF signal, providing, by the remote DSL modem, the R-FLAG signal in accordance with the symbol rate for the synchronous mode of the handshaking; and
   in response to the R-FLAG signal, providing, by the central office DSL modem, a C-FLAG signal in accordance with the symbol rate for the synchronous mode of the handshaking.

2. The method of claim 1 further comprises:
   the central office DSL modem transmitting the initiation signal in response to an R-TONE-REQ signal from the remote DSL modem, wherein the R-TONE-REQ signal requests initiation of a DSL communication.

3. The method of claim 1 further comprises:
   when the initiation signal was interpreted to be the C-TONE signal:
   preparing, by the remote DSL modem, the response signal to be the R-TONE signal for full duplex DSL communication; or
   preparing, by the remote DSL modem, the response signal to be the R-FLAG signal for half duplex DSL communication.

4. The method of claim 3 further comprises:
   in response to the R-TONE signal, providing, by the central office DSL modem, the C-GALF signal to indicate a symbol rate for the full duplex DSL communication;
   in response to the C-GALF signal, providing, by the remote DSL modem, the R-FLAG signal to indicate that the remote DSL modem is ready for the full duplex DSL communication at the symbol rate; and
   in response to the R-FLAG signal, providing, by the central office modem, the C-FLAG signal to indicate that the central office DSL modem is ready for the full duplex DSL communication at the symbol rate.

5. The method of claim 3 further comprises:
   in response to the R-FLAG signal, transmitting, by the central office DSL modem, silence to indicate a readiness for the half duplex DSL communication.

6. The method of claim 1 further comprises:
   when the initiation signal was interpreted to be the C-SYNC signal, not acknowledging the synchronous mode of the handshake by:
   preparing, by the remote DSL modem, the response signal to be the R-TONE signal for full duplex DSL communication; or
   preparing, by the remote DSL modem, the response signal to be the R-FLAG signal for half duplex DSL communication.

7. The method of claim 1, wherein the providing, by the central office DSL modem, a C-GALF signal comprises:
   to indicate a duplex half symbol rate (DHSR) mode, transmitting the C-GALF signal using a DHSR modulation; and
   to indicate a TCM-ISDN Timing Reference (TTR) synchronized (TTRS) mode, transmitting the C-GALF signal using a TTRS modulation.

8. The method of claim 1 further comprises:
   subsequent to providing the R-FLAG and C-FLAG signals, exchanging DSL capabilities between the central office DSL modem and the remote DSL mode in accordance with the symbol rate for the synchronous mode.

9. The method of claim 1 further comprises:
when the response signal is interpreted to be the R-TONE signal or the R-FLAG signal, retransmitting, by the central office DSL modem, the C-SYNC signal until the response signal is the R-SYNC signal or a retry period is exhausted.

10. The method of claim 9 further comprises:
when the retry period is exhausted:
accepting, by the central office DSL modem, the R-TONE signal or the R-FLAG signal; or
terminating, by the central office DSL modem, the handshaking.

11. A method for a central office digital subscriber loop (DSL) modem to participate in a DSL handshaking with a remote DSL modem, the method comprises:
transmitting a C-SYNC signal that utilizes a pattern of symbol times to indicate timing and long range handshake mode, wherein the C-SYNC signal indicates a synchronous mode of handshaking;
receiving a response signal from the remote DSL modem, wherein the response signal is an R-SYNC signal, an R-TONE signal, or an R-FLAG signal, wherein the R-SYNC signal includes an acceptance of the synchronous mode of the handshaking;
interpreting the response signal to determine whether the response signal is the R-SYNC signal, the R-TONE signal, or the R-FLAG signal;
when the response signal is the R-SYNC signal, providing a C-GALF signal to indicate symbol rate for the synchronous mode of the handshaking to the remote DSL modem; and
in response to an R-FLAG signal, providing a C-FLAG signal in accordance with the symbol rate for the synchronous mode of the handshaking.

12. The method of claim 11 further comprises:
transmitting the C-SYNC signal in response to an R-TONE-REQ signal from the remote DSL modem, wherein the R-TONE-REQ signal requests initiation of a DSL communication.

13. The method of claim 11 further comprises:
in response to the R-TONE signal, providing the C-GALF signal to indicate a symbol rate for a full duplex DSL communication, wherein the R-TONE signal indicated the full duplex DSL communication; and
in response to the R-FLAG signal, providing the C-FLAG signal to indicate that the central office DSL modem is ready for the full duplex DSL communication at the symbol rate.

14. The method of claim 11 further comprises:
in response to the R-FLAG signal, transmitting silence to indicate a readiness for a half duplex DSL communication, wherein the R-FLAG signal indicated the half duplex DSL communication.

15. The method of claim 11, wherein the providing the C-GALF signal comprises:
to indicate a duplex half symbol rate (DHSR) mode, transmitting the C-GALF signal using a DHSR modulation; and
to indicate a TCM-ISDN Timing Reference (TTR) synchronized (TTRS) mode, transmitting the C-GALF signal using a TTRS modulation.

16. The method of claim 11 further comprises:
subsequent to providing the C-FLAG signal, exchanging DSL capabilities with the remote DSL mode in accordance with the symbol rate for the synchronous mode.

17. The method of claim 11 further comprises:
when the response signal is interpreted to be the R-TONE signal or the R-FLAG signal, retransmitting the C-SYNC signal until the response signal is the R-SYNC signal or a retry period is exhausted.

18. The method of claim 17 further comprises:
when the retry period is exhausted:
accepting the R-TONE signal or the R-FLAG signal; or
terminating the handshaking.

19. A central office digital subscriber loop (DSL) modem comprises:
processing module; and
memory operably coupled to the processing module, wherein the memory stores operational instructions that cause the processing module to:
transmit a C-SYNC signal that utilizes a pattern of symbol times to indicate timing and long range handshake mode, wherein the C-SYNC signal indicates a synchronous mode of handshaking;
receive a response signal from a remote DSL modem, wherein the response signal is an R-SYNC signal, an R-TONE signal, or an R-FLAG signal, wherein the R-SYNC signal includes an acceptance of the synchronous mode of the handshaking;
interpret the response signal to determine whether the response signal is the R-SYNC signal, the R-TONE signal, or the R-FLAG signal;
when the response signal is the R-SYNC signal, provide a C-GALF signal to indicate symbol rate for the synchronous mode of the handshaking to the remote DSL modem; and
in response to an R-FLAG signal, provide a C-FLAG signal in accordance with the symbol rate for the synchronous mode of the handshaking.

20. The central office DSL modem of claim 19, wherein the memory further stores operational instructions that cause the processing module to:
transmit the C-SYNC signal in response to an R-TONE-REQ signal from the remote DSL modem, wherein the R-TONE-REQ signal requests initiation of a DSL communication.

21. The central office DSL modem of claim 19, wherein the memory further stores operational instructions that cause the processing module to:
in response to the R-TONE signal, provide the C-GALF signal to indicate a symbol rate for a full duplex DSL communication, wherein the R-TONE signal indicated the full duplex DSL communication; and
in response to the R-FLAG signal, provide the C-FLAG signal to indicate that the central office DSL modem is ready for the full duplex DSL communication at the symbol rate.

22. The central office DSL modem of claim 19, wherein the memory further stores operational instructions that cause the processing module to:
in response to the R-FLAG signal, transmit silence to indicate a readiness for a half duplex DSL communication, wherein the R-FLAG signal indicated the half duplex DSL communication.

23. The central office DSL modem of claim 19, wherein the memory further stores operational instructions that cause the processing module to provide the C-GALF signal by:
to indicate a duplex half symbol rate (DHSR) mode, transmitting the C-GALF signal using a DHSR modulation; and
to indicate a TCM-ISDN Timing Reference (TTR) synchronized (TTRS) mode, transmitting the C-GALF signal using a TTRS modulation.

24. The central office DSL modem of claim 19, wherein the memory further stores operational instructions that cause the processing module to:
  subsequent to providing the C-FLAG signal, exchange DSL capabilities with the remote DSL mode in accordance with the symbol rate for the synchronous mode.

25. The central office DSL modem of claim 19, wherein the memory further stores operational instructions that cause the processing module to:
  when the response signal is interpreted to be the R-TONE signal or the R-FLAG signal, retransmit the C-SYNC signal until the response signal is the R-SYNC signal or a retry period is exhausted.

26. The central office DSL modem of claim 25, wherein the memory further stores operational instructions that cause the processing module to:
  when the retry period is exhausted:
  accept the R-TONE signal or the R-FLAG signal; or
  terminate the handshaking.

27. A remote digital subscriber loop (DSL) modem comprises:
  processing module; and
  memory operably coupled to the processing module, wherein the memory stores operational instructions that cause the processing module to:
    receive, from a central office DSL modem, an initiation signal that utilizes a pattern of symbol times to indicate timing and long range handshake mode;
    interpret the initiation signal to be a C-SYNC signal or a C-TONE signal, wherein the C-SYNC signal indicates a synchronous mode of handshaking;
    when the initiation signal was interpreted to be the C-SYNC signal, prepare a response signal that is an R-SYNC signal, an R-TONE signal, or an R-FLAG signal in response to the C-SYNC signal, wherein the R-SYNC signal includes an acceptance of the synchronous mode of the handshaking;
    provide the response signal to the central office DSL modem;
    when the response signal is the R-SYNC signal, receive, from the central office DSL modem, a C-GALF signal to indicate symbol rate for the synchronous mode of the handshaking to the remote DSL modem; and
    in response to the C-GALF signal, provide the R-FLAG signal in accordance with the symbol rate for the synchronous mode of the handshaking.

28. The remote DSL modem of claim 27, wherein the memory further stores operational instructions that cause the processing module to:
  transmit an R-TONE-REQ signal to the central office DSL modem to request initiation of a DSL communication.

29. The remote DSL modem of claim 27, wherein the memory further stores operational instructions that cause the processing module to:
  when the initiation signal was interpreted to be the C-TONE signal:
    prepare the response signal to be the R-TONE signal for full duplex DSL communication; or
    prepare the response signal to be the R-FLAG signal for half duplex DSL communication.

30. The remote DSL modem of claim 29, wherein the memory further stores operational instructions that cause the processing module to:
  in response to the R-TONE signal, receive from the central office DSL modem, the C-GALF signal to indicate a symbol rate for the full duplex DSL communication;
  in response to the C-GALF signal, provide the R-FLAG signal to indicate a readiness for the full duplex DSL communication at the symbol rate; and
  in response to the R-FLAG signal, receive from the central office modem, the C-FLAG signal to indicate that the central office DSL modem is ready for the full duplex DSL communication at the symbol rate.

31. The remote DSL modem of claim 29, wherein the memory further stores operational instructions that cause the processing module to:
  in response to the R-FLAG signal, receive from the central office DSL modem, silence to indicate that the central office DSL modem is ready for the half duplex DSL communication.

32. The remote DSL modem of claim 27, wherein the memory further stores operational instructions that cause the processing module to:
  when the initiation signal was interpreted to be the C-SYNC signal, not acknowledging the synchronous mode of the handshake by:
    preparing the response signal to be the R-TONE signal for full duplex DSL communication; or
    preparing the response signal to be the R-FLAG signal for half duplex DSL communication.

33. The remote DSL modem of claim 27, wherein the memory further stores operational instructions that cause the processing module to receive the C-GALF signal from the central office DSL modem by:
  to indicate a duplex half symbol rate (DHSR) mode, receiving the C-GALF signal using a DHSR modulation; and
  to indicate a TCM-ISDN Timing Reference (TTR) synchronized (TTRS) mode, receiving the C-GALF signal using a TTRS modulation.

34. The remote DSL modem of claim 27, wherein the memory further stores operational instructions that cause the processing module to:
  subsequent to providing the R-FLAG signal, exchange DSL capabilities with the central office DSL modem in accordance with the symbol rate for the synchronous mode.

* * * * *